United States Patent [19]

De Pasquale

[11] Patent Number: 4,835,432

[45] Date of Patent: May 30, 1989

[54] BRUSH HOLDERS WITH SINGLE SPRING

[75] Inventor: Michele De Pasquale, Sesto S. Giovanni, Italy

[73] Assignee: Industrie Magneti Marelli S.r.l., Milan, Italy

[21] Appl. No.: 45,928

[22] Filed: May 4, 1987

[30] Foreign Application Priority Data

May 5, 1986 [IT] Italy .............................. 67365 A/86

[51] Int. Cl.⁴ ....................... H01R 39/46; H02K 13/10

[52] U.S. Cl. .................................... 310/242; 310/239; 267/180

[58] Field of Search ..................... 267/61 R, 166, 174, 267/180; 310/239, 242, 245, 247

[56] References Cited

U.S. PATENT DOCUMENTS

| | | | |
|---|---|---|---|
| 1,258,534 | 3/1918 | Clinton | 267/61 R |
| 1,948,268 | 2/1934 | Kitto | 267/180 |
| 4,600,850 | 7/1986 | Mazzorana et al. | 310/242 |

FOREIGN PATENT DOCUMENTS

| | | | |
|---|---|---|---|
| 63626 | 9/1955 | France | 310/247 |
| 2581260 | 10/1986 | France | 310/239 |
| 162565 | 3/1958 | Sweden | 310/247 |
| 639063 | 12/1978 | U.S.S.R. | 310/239 |

*Primary Examiner*—Patrick R. Salce
*Assistant Examiner*—D. L. Rebsch
*Attorney, Agent, or Firm*—Sughrue, Mion, Zinn, Macpeak, and Seas

[57] ABSTRACT

The brush holder comprises an electrically insulating body having a pair of apertures through which extend first and second brushes, which are movable by means of a single resilient member acting simultaneously on both brushes. This solution enables the wear on the brushes to be reduced significantly, particularly on the negative brush which normally tends to be worn away more rapidly.

4 Claims, 2 Drawing Sheets

BRUSH HOLDERS WITH SINGLE SPRING

DESCRIPTION

The present invention relates to a brush holder, particularly although not exclusively for alternators for use in motor vehicles.

More particularly the invention relates to a brush holder comprising an electrically insulating body, having a pair of apertures through which first and second brushes extend, being movable under the action of resilient pressure means housed in the body.

In brush holders of the type made until now, the said resilient pressure means are constituted by two helical springs, each of which acts at one end against a wall of the body and at the other end against a brush.

In such known devices, there is a problem of wear of the brushes, particularly the negative one, which tends to be worn away rather more rapidly.

It has also been ascertained that the wear of the brushes depends to a large extent on sparking caused, in its turn, by vibrations. The vibrations in the system are much more considerable around the frequency of each of the two "brush-reaction spring" systems in the brush holder; this resonant frequency is proportional to $\sqrt{k/m}$, where k is the elastic modulus of the spring and m is the mass of the brush. In the case of electrical apparatus with commutators mounted in motor vehicles, it is found that the vibrations excited in the brush holders by the vibrations generated in the engine readily fall around the resonance frequencies. Hence, the sparking, and consequently wear, on the brushes may be very marked.

It has also been ascertained that, with regard to the negative brush, the greatest wear can also be imputed to a large extent to electrochemical phenomena: oxides form on the portion of the commutator cooperating with the negative brush, these being favored by the considerable presence of free electrons. These oxides are generally abrasive and thus contribute to the more rapid wear of the negative brush.

The object of the present invention is to provide a brush holder of the aforesaid type which enables the sparking due to vibrations and the wear, particularly of the brush which would tend to be worn away more rapidly, to be reduced considerably.

This object is achieved according to the invention by a brush holder of the aforesaid type, the main characteristic of which lies in the fact that the resilient means comprise a single resilient member acting simultaneously on both brushes.

According to a further characteristic, the resilient member is parallel to the directions of movement of the brushes.

This member is preferably a spring with substantially quadrilateral shaped, preferably rectangular, turns.

Further characteristics and advantages of the brush holder according to the invention will become apparent from the detailed description which follows, given with reference with the appended drawings, provided purely by way of non-limiting example, in which.

Figure 1:
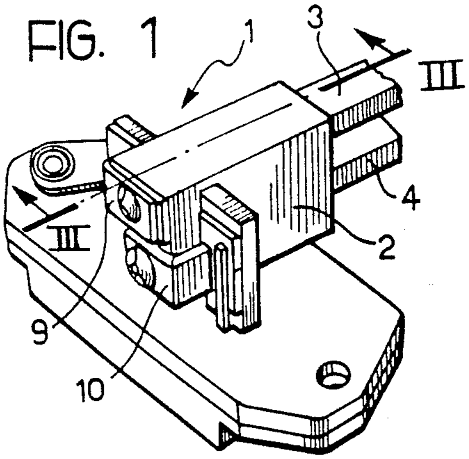
FIG. 1 is a perspective view of a brush holder according to the invention.
Figure 2:
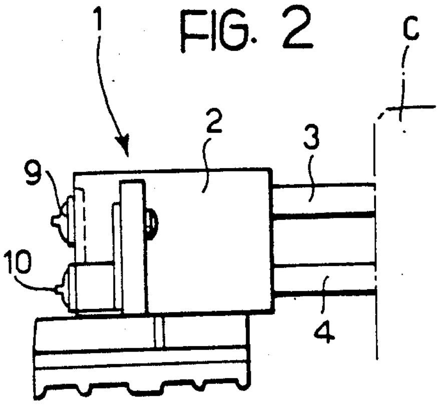
FIG. 2 is a side elevational view of the brush holder shown in FIG. 1.
Figure 3:
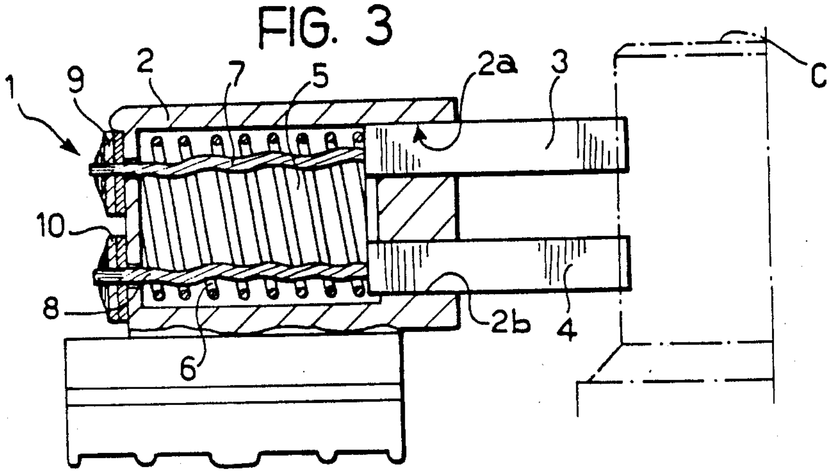
FIG. 3 is a side view on an enlarged scale, sectioned along the line III—III, of FIG. 1.

With reference to FIG. 1, a brush holder 1 according to the invention is generally indicated and comprises a hollow body 2 of electrically insulating material. The body 2 has a pair of apertures 2*a* and 2*b* with parallel axes in its wall intended to face the commutator C of an alternator. Two brushes 3 and 4, positive and negative respectively, are slidably mounted in these apertures. The body 2 defines a chamber 5 in which there is a helical spring 6 with substantially rectangular quadrilateral turns. The spring 6 acts at one end against the wall of the body 2 opposite the apertures 2*a* and 2*b* and at its other end against the ends of the brushes 3 and 4 within the body. The spring 6 thus tends to thrust the brushes 3 and 4 resiliently into the position in which they project from the body 2 towards the commutator C, as shown in FIG. 3. In known manner, the brushes 3 and 4 are connected by insulated copper braids 7 and 8 to metal terminals 9 and 10 attached to the exterior of the body 2. The brushes 3 and 4 can be connected to external circuits through these terminals 9 and 10 attached to the exterior of the body 2. The brushes 3 and 4 can be connected to external circuits through these terminals.

Figure 4:
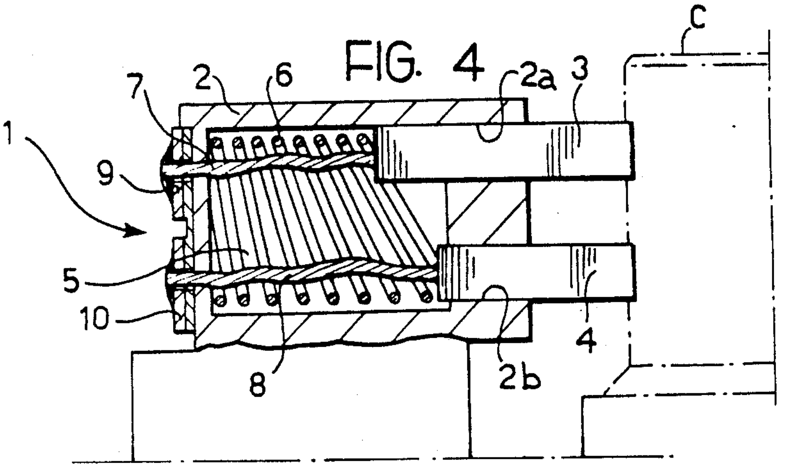
FIG. 4 is a view similar to FIG. 3 showing the brushes in a different condition of use.

As is apparent in particular from FIGS. 3 and 4, the upper and lower portions of the spring 6 located on opposite sides of the longitudinal medial plane of the spring each cooperate with a respective brush.

In operation, the reaction spring 6 and the brushes 3 and 4 form a single vibratory system, characterized by a resonance frequency which is much higher than the resonance frequency of the individual brush-spring systems of prior art brush holders. In the brush holder of the invention it is possible to make the dimensions of the spring 6 and the masses of the brushes 3 and 4 such that the resonance frequency is substantially outside the range of frequencies of the vibrations excited by the engine. Thus, as the invention has been able to show, sparking caused by the vibrations is practically eliminated, and this leads to less wear on both the brushes.

A further advantageous characteristic of the behavior of the brush holder according to the invention can be deduced from an examination of FIG. 4. When one brush, for example the lower brush 4, is worn or consumed to a greater extent than the other for any reason, the portion of the reaction spring 6 acting on the more worn brush exerts a much lighter load on this brush than the other portion of the spring exerts on the less worn brush. In other words, as soon as unequal wear tends to be created between the two brushes, the less worn brush is more loaded by the spring 6 while the more worn brush is relatively less loaded. This results in an equalization of the wear between the two brushes.

Figure 5:
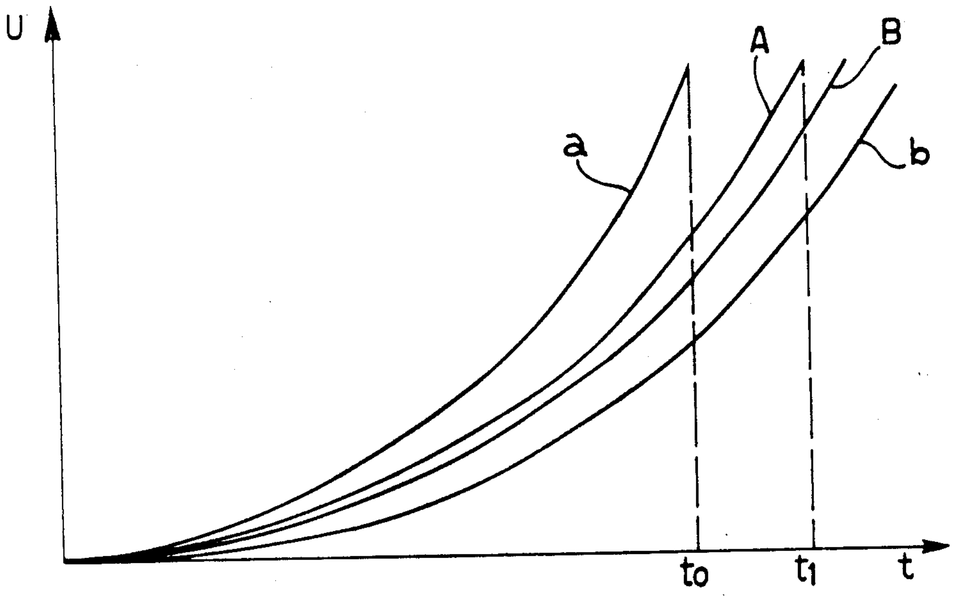
FIG. 5 is a graph showing the changes in the wear of the brushes in the brush holder device of the invention and in a prior art device as a function of time t given on the abscissa.

FIG. 5 shows qualitatively and graphically the wear U (for example expressed in millimeters) as a function of time t on the abscissa. More particularly FIG. 5 shows two curves a and b which represent typical changes in the wear on the negative and positive brushes respectively in a conventional brush holder. As is apparent from these curves, the negative brush wears more quickly than the positive one and in practice at the time $t_o$ the negative brush is completely worn away and the circuit in which it is connected is broken.

In FIG. 5, A and B indicate curves relating to the wear of the negative and positive brushes respectively in a brush holder according to the invention. An examination of FIG. 5 shows first of all that the wear curves A and B are much closer together as a result of the equalization of the wear of the two brushes described above. Moreover, the wear on the negative brush is considerably reduced and assumes values practically corresponding to those of the positive brush. In the brush holder of the invention, the circuit including the brushes 3 and 4 is broken at the instant indicated $t_1$ in FIG. 5 with an increase in the useful life of the device equal to $t_1 - t_0$.

Naturally, the principle of the invention remaining the same, the embodiments and constructional details may be varied widely with respect to those described and illustrated purely by way of non-limiting example, without thereby departing from the scope of the present invention.

I claim:

1. A brush holder for alternators comprising:

an electrically insulating body having a pair of spaced apart apertures through which extend positive and negative brushes which are mounted for movement in substantially parallel directions on a first and second axis by means of resilient pressure means housed in the body;

said resilient means comprising a single helical spring centered on a third axis parallel to and between said first and second axes which is disposed in contact with and acts simultaneously on both brushes.

2. A brush holder according to claim 1, wherein the helical spring has substantially quadrilateral shaped turns.

3. A brush holder according to claim 2, wherein the spring has rectangular turns.

4. A brush holder according to claim 3, wherein the spring is located in the body so that its portions on opposite sides of the longitudinal median plane of the spring cooperate with the brushes respectively.

* * * * *